US012195063B2

(12) United States Patent
Jiang et al.

(10) Patent No.: US 12,195,063 B2
(45) Date of Patent: Jan. 14, 2025

(54) METHOD FOR POSITIONING AUXILIARY TRANSPORTATION VEHICLE IN COAL MINE AND POSITIONING SYSTEM THEREOF

(71) Applicants: China University of Mining and Technology, Jiangsu (CN); Xuzhou Kerui Mining Technology Co., Ltd., Jiangsu (CN)

(72) Inventors: Fan Jiang, Jiangsu (CN); Zhencai Zhu, Jiangsu (CN); Xingtao Huang, Jiangsu (CN); Gongbo Zhou, Jiangsu (CN); Niansheng Liu, Jiangsu (CN); Libing Wang, Jiangsu (CN); Chuansheng Zhang, Jiangsu (CN); Yuxing Peng, Jiangsu (CN); Gang Shen, Jiangsu (CN); Chaofan Zhang, Jiangsu (CN); Wenwen Yi, Jiangsu (CN); Shuman Cheng, Jiangsu (CN); Zhengxu Wang, Jiangsu (CN)

(73) Assignees: China University of Mining and Technology, Jiangsu (CN); Xuzhou Kerui Mining Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/034,386

(22) PCT Filed: Sep. 30, 2022

(86) PCT No.: PCT/CN2022/123140
§ 371 (c)(1),
(2) Date: Apr. 28, 2023

(87) PCT Pub. No.: WO2023/124340
PCT Pub. Date: Jul. 6, 2023

(65) Prior Publication Data
US 2024/0317283 A1 Sep. 26, 2024

(30) Foreign Application Priority Data

Dec. 27, 2021 (CN) .......................... 202111616413.9

(51) Int. Cl.
B61L 25/02 (2006.01)
(52) U.S. Cl.
CPC ................................ B61L 25/025 (2013.01)
(58) Field of Classification Search
CPC ............................ B61L 25/025; B61D 11/00
See application file for complete search history.

(56) References Cited

U.S. PATENT DOCUMENTS 6,608,913 B1 * 8/2003 Hinton .................. G01C 15/00
382/104

FOREIGN PATENT DOCUMENTS

CN 102556075 7/2012
CN 108873038 11/2018
(Continued)

OTHER PUBLICATIONS

Machine Translation of Chen's reference (CN-108873038-A) (Year: 2018).*

(Continued)

Primary Examiner — Tarek Elarabi
(74) Attorney, Agent, or Firm — JCIPRNET

(57) ABSTRACT

The present disclosure discloses a method for positioning an auxiliary transportation vehicle in a coal mine and a positioning system thereof. The method comprises: acquiring a rotation velocity of each wheels and a rotation angle of a steering wheel, constructing a kinematics model based on wheels not for steering of the vehicle and a kinematics model based on wheels for steering of the vehicle respectively, and constructing a kinematics model based on a geometric center of the vehicle according to the above two kinematics models; and according to a travelling condition
(Continued)

of the vehicle, integrating the kinematics model based on the geometric center with a strap-down inertial navigation system for positioning, when the vehicle is in a normal travelling state; and integrating, the kinematics model based on the wheels not for steering with the strap-down inertial navigation system for positioning, when the vehicle is in an abnormal travelling state.

7 Claims, 3 Drawing Sheets

(56) References Cited

FOREIGN PATENT DOCUMENTS

| | | | | |
|---|---|---|---|---|
| CN | 108873038 A | * | 11/2018 | ............ G01S 19/46 |
| CN | 110133694 | | 8/2019 | |
| CN | 111780756 | | 10/2020 | |
| CN | 114394130 | | 4/2022 | |
| DE | 102004043177 | | 11/2005 | |

OTHER PUBLICATIONS

"International Search Report (Form PCT/ISA/210) of PCT/CN2022/123140," mailed on Dec. 28, 2022, pp. 1-5.
"Written Opinion of the International Searching Authority (Form PCT/ISA/237) of PCT/CN2022/123140," mailed on Jan. 9, 2023, with English translation thereof, pp. 1-10.

* cited by examiner

METHOD FOR POSITIONING AUXILIARY TRANSPORTATION VEHICLE IN COAL MINE AND POSITIONING SYSTEM THEREOF

CROSS-REFERENCE TO RELATED APPLICATION

This application is a 371 of international application of PCT application serial no. PCT/CN2022/123140, filed on Sep. 30, 2022, which claims the priority benefit of China application no. 202111616413.9, filed on Dec. 27, 2021. The entirety of each of the above mentioned patent applications is hereby incorporated by reference herein and made a part of this specification.

TECHNICAL FIELD

The present disclosure belongs to the technical field of transportation positioning of an underground auxiliary vehicle in a coal mine, in particular to a method for positioning an auxiliary vehicle transportation vehicle in a coal mine and a positioning system thereof.

RELATED ART

With the proposal of intelligent mines and the development of intelligent coal mines, higher requirements have been put forward for the positioning accuracy of auxiliary transportation vehicles in coal mines, a single positioning technology is currently difficult to satisfy the positioning accuracy requirements of vehicles, and integrated positioning is increasingly being adopted. The most representative one is the integrated positioning system based on the wheel encoder and the strap-down inertial navigation system, which can reduce the cumulative error of the strap-down inertial navigation system to a certain extent and improve the positioning accuracy through the complementary advantages of the wheel encoder and the strap-down inertial navigation system, and is an ideal integrated positioning solution.

However, abnormal conditions such as skidding and sliding will occur during the travelling of the auxiliary transportation vehicle, which will lead to the failure of the encoder positioning. If the failure of the encoder positioning is not detected and isolated in time, the positioning accuracy of the auxiliary transportation vehicle will be seriously affected. At present, a mainstream solution is that when the auxiliary transportation vehicle is detected to be slipping or sliding and other abnormal conditions, the fault is isolated in time, and only strap-down inertial navigation system is used for positioning during the slipping or sliding phase, which can effectively avoid the influences generated by the abnormal conditions of the vehicle such as wheel slippage.

However, this also has a disadvantage that cannot be ignored, that is, after the auxiliary transportation vehicle is found to be slipping or sliding and other abnormal conditions and is isolated in time, only a single strap-down inertial navigation system is used for positioning at this stage, if the vehicle is in the slipping or sliding state for a long time, the cumulative error will continue to increase, which seriously affects the positioning accuracy, and the error can be restrained only when the auxiliary transportation vehicle returns to normal.

SUMMARY OF INVENTION

In order to solve at least one of the above-mentioned technical problems, according to one aspect of the present disclosure, a method for positioning an auxiliary transportation vehicle in a coal mine is provided, which comprises the following steps.

In step 1, a rotation velocity of each wheel and a rotation angle of a steering wheel are acquired, a kinematics model based on wheels not for steering of the vehicle and a kinematics model based on wheels for steering of the vehicle are constructed respectively, and a kinematics model based on a geometric center of the vehicle is constructed according to the kinematics model based on the wheels not for steering of the vehicle and the kinematics model based on the wheels for steering of vehicle.

In step 2, according to a travelling condition of the vehicle,
 a, when the vehicle is in a normal travelling state, the kinematics model based on the geometric center of the vehicle is integrated with a strap-down inertial navigation system for positioning;
 b, when the vehicle is in an abnormal travelling state, the kinematics model based on the wheels not for steering of the vehicle is integrated with the strap-down inertial navigation system for positioning.

According to the method for positioning the auxiliary transportation vehicle in the coal mine in an embodiment of the present disclosure, preferably, the kinematics model based on the wheels not for steering of the vehicle in the step 1 is as follows.

In S10, a forward velocity $v_{O_1}$ of the vehicle based on the wheels not for steering is $$v_{O_1} = \frac{v_A + v_B}{2}.$$

In S11, a heading angle $\theta$ of the vehicle based on the wheels not for steering is $$\theta = \theta_1 = \theta_2 = \sin\theta_1 = \frac{d}{L} = \frac{(v_B - v_A)\cdot \Delta t}{L}.$$

In S12, an output of the kinematics model based on the wheels not for steering of the vehicle is $$[v_{O_1}\, \theta]^T.$$

Where $v_A$ is a rotation velocity of one wheel not for steering of the vehicle, $v_B$ is a rotation velocity of another wheel not for steering of the vehicle, $\theta_1$ is an included angle between non-steering axles at two adjacent time points, and $\theta_2$ is an included angle between extension lines of non-steering axles at two adjacent time points, d is a distance traveled by one wheel not for steering that exceeds a distance traveled by another wheel not for steering at two adjacent time points, L is a distance between the two wheels not for steering, and $\Delta t$ is a time difference.

According to the method for positioning the auxiliary transportation vehicle in the coal mine in an embodiment of the present disclosure, preferably, the kinematics model based on the wheels for steering of the vehicle in the step 1 is as follows.

In S20, a forward velocity $v_{O_2}$ of the vehicle based on the wheels for steering is $$v_{O_2} = \frac{v_C + v_D}{2}.$$

In S21, a heading angle φ of the vehicle based on the wheels for steering is $$\varphi = \frac{\delta_1 + \delta_2}{2} = \frac{\lambda_1 \phi + \lambda_2 \phi}{2}.$$

A constraint relationship between δ1 and δ2 is $$\cot \delta_2 - \cot \delta_1 = \frac{L}{H}.$$

In S22, an output of the kinematics model based on the wheels for steering of the vehicle is $$[v_{O_2} \varphi]^T.$$

Where $v_C$ is a rotation velocity of one wheel for steering of the vehicle, $v_D$ is a rotation velocity of another wheel for steering of the vehicle, $\delta_1$ is a deflection angle of one wheel for steering of the vehicle, $\delta_2$ is a deflection angle of another wheel for steering of the vehicle, $\phi$ is the rotation angle of the steering wheel, and $\lambda_1$ is a proportional coefficient of $\delta_1$ relative to $\phi$, $\lambda_2$ is a proportional coefficient of $\delta_2$ relative to $\phi$, and H is a distance between the two axles of the vehicle.

According to the method for positioning the auxiliary transportation vehicle in the coal mine in an embodiment of the present disclosure, preferably, the kinematics model based on the geometric center of the vehicle in the step 1 is as follows.

In S30, a forward velocity $v_0$ of the vehicle based on the geometric center is $$v_0 = \frac{v_{O_1} + v_{O_2}}{2}.$$

In S31, a heading angle ψ of the vehicle based on the geometric center is $$\psi = \frac{\theta + \varphi}{2}.$$

In S32, an output of the kinematics model based on the geometric center of the vehicle is $$[v_O \psi]^T.$$

According to the method for positioning the auxiliary transportation vehicle in the coal mine in an embodiment of the present disclosure, preferably, in the step 2, the kinematics model is integrated with the strap-down inertial navigation system for positioning through Kalman filtering.

According to the method for positioning the auxiliary transportation vehicle in the coal mine in an embodiment of the present disclosure, preferably, in the step 2, steps of determining that the vehicle is in the abnormal state are as follow.

A threshold $v_{m1}=(1+k)v_{O_2}$ is set, and a threshold $v_{m2}=(1-k)v_{O_2}$ is set, where k is 0.2 to 0.3.

When $v_{O_1} \geq v_{m1}$ or $v_{O_1} \leq v_{m2}$ is detected, the vehicle is determined to be in the abnormal travelling state.

According to the method for positioning the auxiliary transportation vehicle in the coal mine in an embodiment of the present disclosure, preferably, the step 2 further includes a following step:

c, when the vehicle passes through an intersection of an underground roadway, positioning information of the vehicle is calibrated according to positioning information of a corresponding intersection.

According to the method for positioning the auxiliary transportation vehicle in the coal mine in an embodiment of the present disclosure, preferably, the step 2 further includes a following step:

d, the positioning information of the vehicle is corrected by a zero velocity correction algorithm, when the vehicle is in a midway shutdown state.

According to another aspect of the present disclosure, provided is a system for positioning an auxiliary transportation vehicle in a coal mine, the system includes as follows.

A strap-down inertial navigation module is installed at a center position of the vehicle.

Four encoder modules are installed on axles of the vehicle and respectively connected with four wheels to detect rotation velocity of the four wheels respectively.

An angle sensor module is installed on an input shaft of a steering wheel of the vehicle to detect a rotation angle of the steering wheel.

A communication module is installed on the vehicle and configured to receive and transmit data.

A plurality of beacon calibration modules are respectively installed at each branch roadway and calibrated with position information corresponding to the installation positions, when the vehicle travels to the branch roadway, the beacon calibration module calibrates the positioning information of the vehicle.

A data processing module is arranged in a dispatching room outside a main roadway, data for the strap-down inertial navigation module, the encoder modules, the angle sensor module and the beacon calibration modules are transmitted by the communication module to the data processing module, and the positioning information is processed in the data processing module.

A monitoring industrial computer is arranged in the dispatching room outside the main roadway, processing results of the data processing module are stored and presented in the monitoring industrial computer.

According to another aspect of the present disclosure, provided is a computer-readable storage medium for storing non-transitory computer-readable instructions, when the non-transitory computer-readable instructions are executed by a computer, the method for positioning the auxiliary transportation vehicle in the coal mine is implemented.

Beneficial Effects

Compared with the prior art, the present disclosure at least has the following beneficial effects.

In the method for positioning the auxiliary transportation vehicle in the coal mine of the present disclosure, the kinematics models of the auxiliary transportation vehicle based on the wheels for steering and wheels not for steering are respectively constructed by installing the encoders on the four wheels of the auxiliary transportation vehicle and installing the angle sensor on the steering wheel, and the kinematics model based on the geometric center of the vehicle is constructed according to the above-mentioned two models. These models jointly constitute a multi-encoder redundant positioning system, which monitors that whether the wheels occurs the abnormal conditions such as slipping or sliding by setting thresholds. When the auxiliary transportation vehicle is in a normal state, the kinematics models based on the encoders of the four wheels are integrated with the strap-down inertial navigation module for positioning. When the driving wheels of the auxiliary transportation vehicle are monitored to be slipping or sliding, it is isolated in time, and the kinematics model based on the wheels for steering is integrated with the strap-down inertial navigation system for positioning, which reduces the impact on the positioning accuracy caused by abnormal conditions such as slipping or sliding of the auxiliary transportation vehicle to the maximum extent, further reduces the cumulative error of the positioning system with the assistance of the beacon calibration module and the zero velocity correction algorithm, improves the positioning accuracy, and is high in compatibility, high in accuracy, simple, easy to implement, convenient and reliable.

BRIEF DESCRIPTION OF DRAWINGS

In order to describe the technical solutions in the embodiments of the present disclosure more clearly, the following will briefly introduce the accompanying drawings of the embodiments. It will be apparent that the accompanying drawings in the following description merely relate to some embodiments of the present disclosure, rather than limiting the present disclosure.

DESCRIPTION OF EMBODIMENTS

In order to make the objectives, technical solutions and advantages of the embodiments of the present invention more clear, the technical solutions in the embodiments of the present disclosure will be clearly and completely described below with reference to the accompanying drawings of the embodiments of the present disclosure. It will be apparent that the described embodiments are only a part of embodiments of the present disclosure, rather than all the embodiments. All other embodiments obtained by a person of ordinary skill in the art based on the embodiments of the present disclosure without creative effects shall fall within the protection scope of the present disclosure.

Unless defined otherwise, technical terms or scientific terms used herein have the ordinary meaning as understood by one of ordinary skill in the art to which the present disclosure belongs.

Embodiment 1

Figure 1:
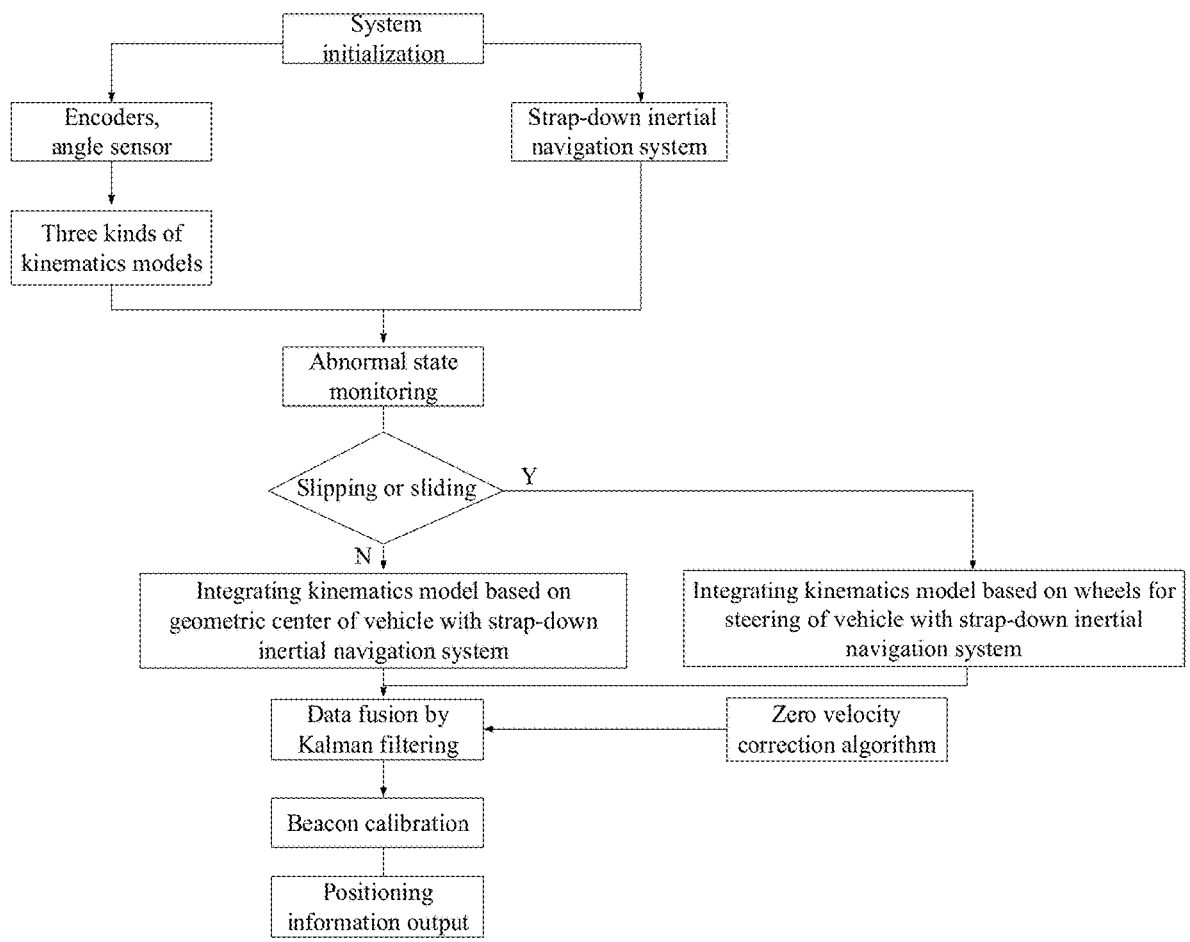
FIG. 1 illustrates a flow chart of a method for positioning an auxiliary transportation vehicle in a coal mine in the present disclosure.

As illustrated in FIG. 1, a method for positioning an auxiliary transportation vehicle in a coal mine includes the following steps.

In step 1, a rotation velocity of each wheel and a rotation angle of a steering wheel are acquired through encoders and an angle sensor, a kinematics model based on wheels not for steering of the vehicle and a kinematics model based on wheels for steering of the vehicle are constructed respectively, and a kinematics model based on a geometric center of the vehicle is constructed according to the kinematics model based on the wheels not for steering of the vehicle and the kinematics model based on the wheels for steering of vehicle.

Figure 2:
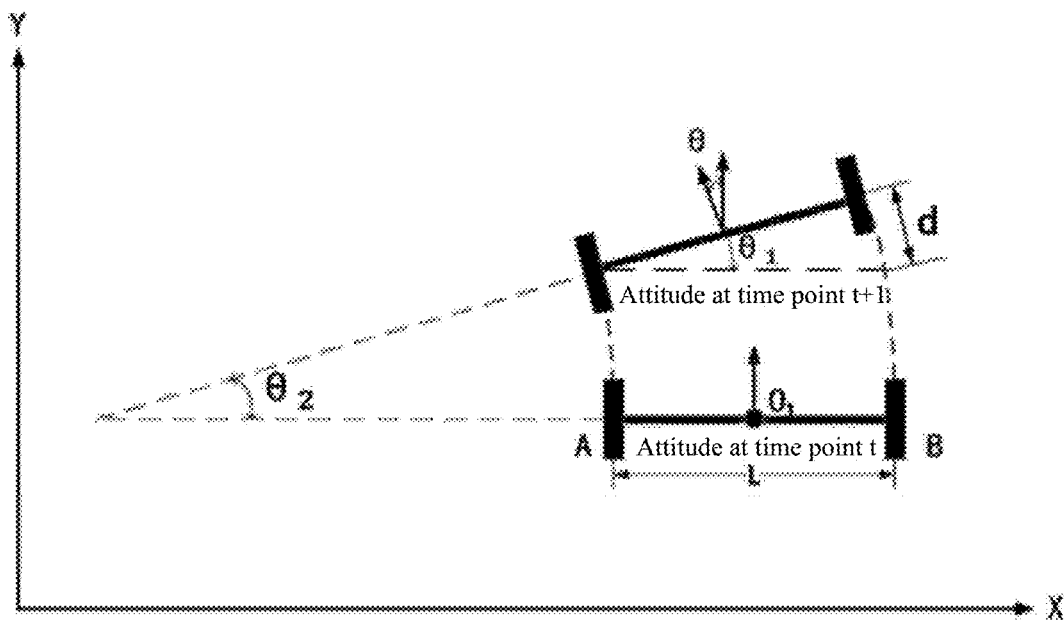
FIG. 2 illustrates a schematic diagram of constructing a kinematics model based on wheels not for steering of a vehicle.

The kinematics model based on the wheels not for steering of the vehicle is as illustrated in FIG. 2, and the details are as follows.

In S10, a forward velocity $v_{O_1}$ of the vehicle based on the wheels not for steering is $$v_{O_1} = \frac{v_A + v_B}{2}.$$

In S11, a heading angle $\theta$ of the vehicle based on the wheels not for steering is $$\theta = \theta_1 = \theta_2 = \sin\theta_1 = \frac{d}{L} = \frac{(v_B - v_A) \cdot \Delta t}{L}.$$

In S12, an output of the kinematics model based on the wheels not for steering of the vehicle is $$[v_{O_1} \theta]^T.$$

In this embodiment, the four wheels of the underground auxiliary transportation vehicle are wheel A, wheel B, wheel C and wheel D, respectively. The two wheels not for steering are rear wheel A and rear wheel B, and the two wheels for steering are front wheel C and front wheel D. $v_A$ is a rotation velocity of the wheel A of the vehicle, $v_B$ is a rotation velocity of the wheel B of the vehicle, $\theta_1$ is an included angle between non-steering wheel axles at two adjacent time points, that is, at time point t and time point t+1, and $\theta_2$ is an included angle between extension lines of non-steering axles at two adjacent time points, that is, at time point t and time point t+1, d is a distance traveled by one wheel not for steering that exceeds a distance traveled by the other wheel not for steering at two adjacent time points, in this embodiment, d is a distance traveled by wheel B of the vehicle that exceeds a distance traveled by wheel A of the vehicle at time point t and time point t+1, L is a distance between the two wheels not for steering, and $\Delta t$ is a time difference.

Figure 3:
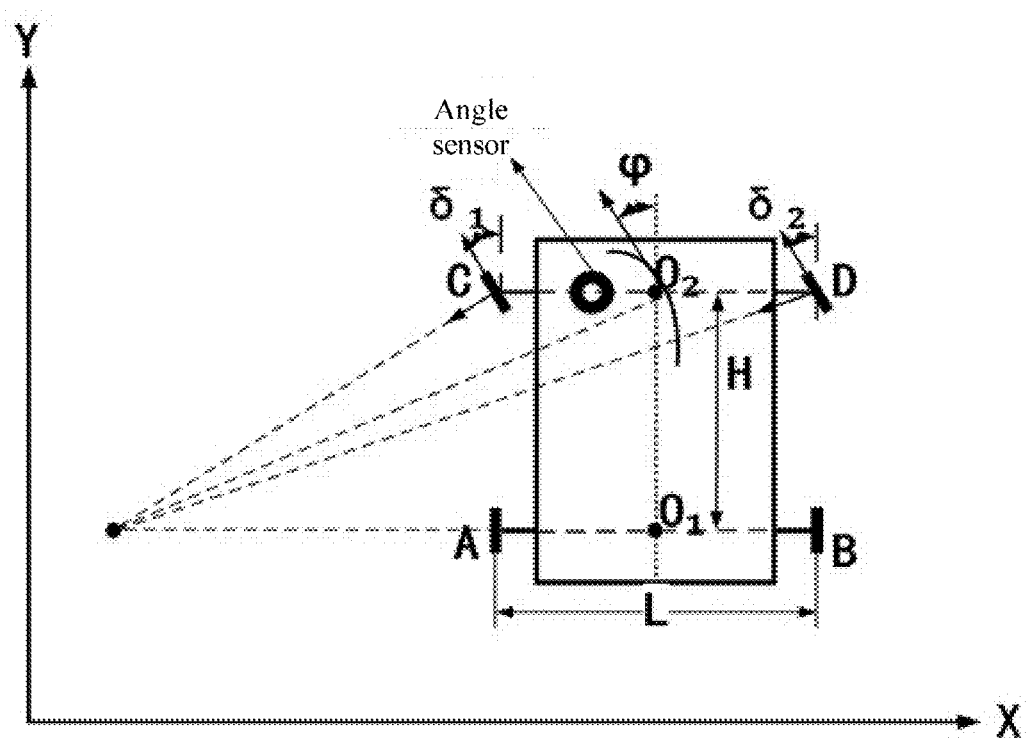
FIG. 3 illustrates a schematic diagram of constructing a kinematics model based on wheels for steering of the vehicle.

The kinematics model based on the wheels for steering of the vehicle is as illustrated in FIG. 3, the details are as follows.

In S20, a forward velocity $v_{O_2}$ of the vehicle based on the wheels for steering is $$v_{O_2} = \frac{v_C + v_D}{2}.$$

In S21, a heading angle $\varphi$ of the vehicle based on the wheels for steering is $$\psi = \frac{\delta_1 + \delta_2}{2} = \frac{\lambda_1 \phi + \lambda_2 \phi}{2}.$$

A constraint relationship between $\delta 1$ and $\delta 2$ is $$\cot\delta_2 - \cot\delta_1 = \frac{L}{H}.$$

In S22, an output of the kinematics model based on the wheels for steering of the vehicle is $$[v_{O_2}\varphi]^T.$$

Where $v_C$ is a rotation velocity of the wheel C of the vehicle, $v_D$ is a rotation velocity of wheel D of the vehicle, $\delta_1$ is a deflection angle of wheel C of the vehicle, $\delta_2$ is a deflection angle of wheel D of the vehicle, $\phi$ is a rotation angle of the steering wheel, and $\lambda_1$ is a proportional coefficient of $\delta_1$ relative to $\phi$, $\lambda_2$ is a proportional coefficient of $\delta_2$ relative to $\phi$, the rotation angle $\phi$ of the steering wheel is detectable by the angle sensor, $\lambda_{11}$ and $\lambda_2$ are determined by calibrating, and H is a distance between the two axles of the vehicle.

Figure 4:
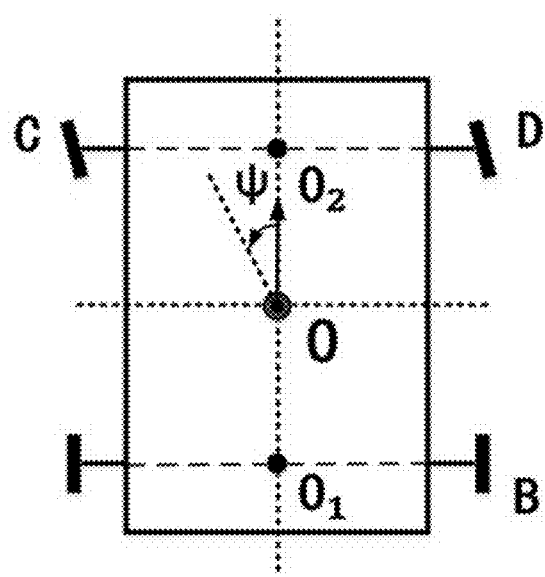
FIG. 4 illustrates a schematic diagram of constructing a kinematics model based on a geometric center of the vehicle.

The kinematics model based on the geometric center of the vehicle is as illustrated in FIG. 4, the details are as follows.

In S30, a forward velocity $v_0$ of the vehicle based on the geometric center is $$v_0 = \frac{v_{O_1} + v_{O_2}}{2}.$$

In S31, a heading angle $\psi$ of the vehicle based on the geometric center is $$\psi = \frac{\theta + \varphi}{2}.$$

In S32, an output of the kinematics model based on the geometric center of the vehicle is $$[v_O\psi]^T.$$

This embodiment constructs the kinematics models based on the wheels for steering and the wheels not for steering respectively by installing the encoders at the four wheels of the vehicle and the angle sensor configured to detect the rotation angle of the steering wheel, and further derives the kinematics model based on the geometric center of the vehicle, which discloses the geometric relationship between the forward velocity, heading angle and rotation velocity of the wheel, rotation angle of the steering wheel of the transportation vehicle. The resolving variables based on the kinematics models of the wheels for steering and the wheels not for steering of the vehicle are encoder data and angle sensor data and the geometry dimensions of the auxiliary transportation vehicle. The velocity and the heading angle at the midpoint of the line connecting the two wheel centers are taken as the characterization of the kinematics model, and the kinematics model based on the geometric center of the vehicle is constructed on the kinematics model based on the wheels for steering and the wheels not for steering, the parameters for the two kinematics models based on the wheels for steering and wheels not for steering are integrated into the kinematics model that takes the velocity and the heading angle at the geometric center of the vehicle body as the characterization to realize the multi-encoder redundant function.

Further, for the conventional underground auxiliary transportation vehicle, the rear wheels are generally wheels not for steering, and the front wheels are wheels for steering, which are configured to control the steering of the vehicle. During the turning processing, the front wheels will have a deviation angle, whereas in fact, the deflection angles $\delta_1$ and $\delta_2$ of the front left wheel and the front right wheel are different. The deflection angle of the wheel inside the turning is larger than the deflection angle of the wheel outside the turning. The kinematics model constructed by this embodiment can further reduce the influence of the error. According to the kinematics models based on the wheels not for steering and wheels for steering, a kinematics model is constructed based on the geometric center of the vehicle, which integrates the output of the two kinematics models into the output of the geometric center O of the vehicle body to implement the multi-encoder redundant function, and improves the accuracy and stability of the positioning system.

In step 2, according to a travelling condition of the vehicle, a, when the vehicle is in a normal travelling state, the kinematics model based on the geometric center of the vehicle is integrated with a strap-down inertial navigation system for positioning;

b, when the vehicle is in an abnormal travelling state, the kinematics model based on the wheels not for steering of the vehicle is integrated with the strap-down inertial navigation system for positioning;

c, when the vehicle passes through an intersection of an underground roadway, positioning information of the vehicle is calibrated according to positioning information of a corresponding intersection; and d, the positioning information of the vehicle is corrected by a zero velocity correction algorithm, when the vehicle is in a midway shutdown state.

Further, for a of the step 2 and b of the step 2, the kinematics model is integrated with the strap-down inertial navigation system for positioning through Kalman filtering, and the details are as follows.

In S40, a state equation $\dot{X}(t)$ of Kalman filtering is constructed as $$\dot{X}(t) = F(t)X(t) + G(t)w(t),$$

where F(t) is a state matrix of the integrated system, X(t) is a state variable of the integrated system, w(t) is noise of the integrated system, and G(t) is a transition matrix of the noise in the integrated system.

In S41, the state variable X(t) of the integrated system is $$X(t) = \left[(\varphi^n)^T, (\delta v^n)^T, (\delta p)^T, (\varepsilon^b)^T, (\nabla^b)^T, \delta K_D, \delta\alpha\right]^T,$$

where $\varphi^n$ is an attitude error, $\delta v^n$ is a velocity error, $\delta p$ is a position error, $\varepsilon^b$ is a gyro bias, $\nabla^b$ is an accelerometer bias, $\delta K_D$ is an odometer scale factor error, and $\delta\alpha$ is an installation deviation angle.

In S42, a measurement equation Z(t) of the Kalman filtering is constructed as $$Z(t) = H(t)X(t) + V(t) = v_{SINS} - v_{OD} = [\delta V^n]^T = [\delta v_E, \delta v_N]^T,$$

where H(t) is a measurement matrix, V(t) is a measurement noise vector, $v_{SINS}$ is a velocity resolved by the strap-down inertial navigation system in a navigation coordinate system, and $v_{OD}$ is a velocity resolved by the kinematics model;

$\delta v_E$ is an eastward component of a velocity difference resolved by the strap-down inertial navigation system and the kinematics model, and $\delta v_N$ is a northward component of a velocity difference resolved by the strap-down inertial navigation system and the kinematics model.

The velocity difference resolved by the strap-down inertial navigation system and the kinematics model is taken as a measurement value for the Kalman filtering. Therefore, the state equation of Kalman filtering can be utilized for the state variable X(t) of the system, that is, the measurement value for the strap-down inertial navigation system to perform error correction.

Further, the abnormal state of the vehicle is the state of the vehicle when the driving wheel slips or slides, and the steps for determining that the vehicle is in the abnormal state in this embodiment are as follows.

A threshold $v_{m1}=(1+k)v_{O_2}$ is set, and a threshold $v_{m2}=(1-k)v_{O_2}$ is set, where k is set as ranging from 0.2 to 0.3 based on experience and theory.

When $v_{O_1} \geq v_{m1}$ is detected, it is indicated that the driving wheel of the vehicle slips; when $v_{O_1} \leq v_{m2}$ is detected, it is indicated that the driving wheel of the vehicle slides; at this time, the vehicle is determined in an abnormal travelling state, and the fault isolation is required, and the integrated positioning mode of the kinematics model based on the geometric center of the vehicle and the strap-down inertial navigation system is switched to the integrated model of the kinematics model based on the wheels not for steering of the vehicle and the strap-down inertial navigation system.

In this embodiment, when the driving wheel of the auxiliary transportation vehicle in the coal mine does not slip or slide, the constructed kinematics model based on the geometric center of vehicle is integrated with the strap-down inertial navigation system, and the Kalman filtering is utilized for data fusion to output the positioning information of the auxiliary transportation vehicle. The kinematics model constructed by multi-encoder redundancy can minimize the impact on the integrated positioning caused by the minor slipping of the wheels, and improves the robustness of the positioning system. When the driving wheel is detected to slip or slide, the constructed kinematics model based on the wheels for steering is integrated with the strap-down inertial navigation module for positioning, which can detect and isolate faults in time, and minimize the impact caused by the slipping of the wheels, ensure that the encoders is participated in the positioning system integrated with the strap-down inertial navigation system when the wheel slips or slides.

For c of the step 2, considering that the positioning system consisted of the strap-down inertial navigation and the encoder may produce a relatively large positioning error due to the principle reasons in the case where the auxiliary transportation vehicle needs to turn when travelling to an roadway intersection in the underground roadway of the coal mine, in order to solve this problem and further improve the positioning accuracy, the beacon calibration module is arranged at the roadway intersection. Because of the fixed position of the roadway intersection in the coal mine, the position information of each beacon calibration module is calibrated in advance, when the auxiliary transportation vehicle passes through the beacon calibration module, the monitoring industrial computer sends the actual position coordinates sent by the beacon calibration module to the integrated positioning system through the communication module, and the position coordinates are taken as the initial position at the current moment to implement the calibration of the positioning information, thereby eliminating the cumulative error of the positioning system in stages, which can further improve the positioning accuracy.

For d of the step 2, the auxiliary transportation vehicle may currently shut down due to factors such as loading and unloading and people getting on and off during the travelling process. The zero velocity correction algorithm is activated to correct the positioning information of the auxiliary transportation vehicle by utilizing the characteristic that the velocity of the auxiliary transportation vehicle is zero when shutting down, which further reduces the cumulative error of the positioning system. The zero velocity correction algorithm of this embodiment is also calculated by the Kalman filtering, the details are as follows.

In S50, the state equation of Kalman filtering X(t) is constructed as $$\dot{X}(t) = F(t)X(t) + G(t)w(t),$$

where F(t) is the state matrix of the integrated system, X(t) is the state variable of the integrated system, w(t) is the noise of the integrated system, and G(t) is the transition matrix of the noise in the integrated system.

In S51, the measurement equation Z(t) of the Kalman filtering is constructed as $$Z(t) = [SV^n]^T = H(t)X(t) + V(t).$$

The velocity output of the strap-down inertial navigation system is the velocity error when the auxiliary transportation vehicle is shut down, which is taken as the measurement value for the Kalman filtering. Therefore, the state equation of the Kalman filtering can be utilized to correct the error of the state variable X(t) of the system, that is, the measurement value for the strap-down navigation system.

In the method for positioning the auxiliary transportation vehicle in the coal mine of the present disclosure, the kinematics models of the auxiliary transportation vehicle based on the wheels for steering and wheels not for steering are respectively constructed by installing the encoders on the four wheels of the auxiliary transportation vehicle and installing the angle sensor on the steering wheel, and the kinematics model based on the geometric center of the vehicle is constructed according to the above-mentioned two models. These models jointly constitute a multi-encoder redundant positioning system, which monitors that whether the wheels occurs the abnormal conditions such as slipping or sliding by setting thresholds. When the auxiliary transportation vehicle is in a normal state, the kinematics models based on the encoders of the four wheels are integrated with the strap-down inertial navigation module for positioning. When the driving wheels of the auxiliary transportation vehicle are monitored to be slipping or sliding, it is isolated in time, and the kinematics model based on the wheels for steering is integrated with the strap-down inertial navigation system for positioning, which reduces the impact on the positioning accuracy caused by abnormal conditions such as slipping or sliding of the auxiliary transportation vehicle to the maximum extent, further reduces the cumulative error of the positioning system with the assistance of the beacon calibration module and the zero velocity correction algorithm, improves the positioning accuracy, and has great practical significance and promotion value.

Embodiment 2

Figure 5:
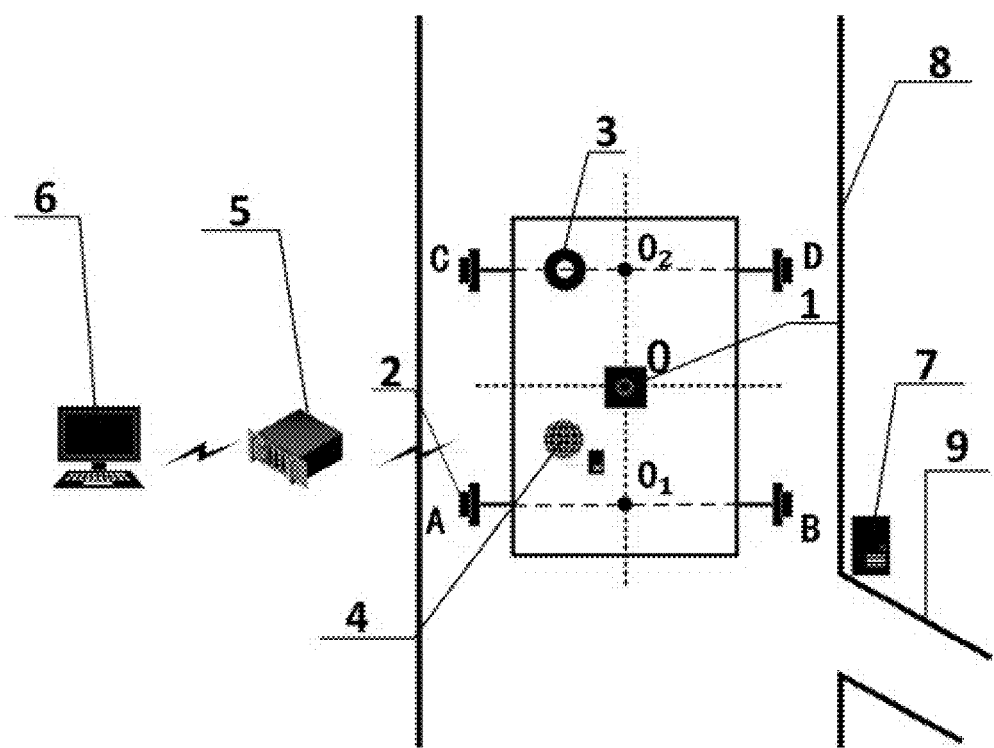
FIG. 5 illustrates a schematic diagram of a system for positioning an auxiliary transportation vehicle in a coal mine in the present disclosure.

The system for positioning the auxiliary transportation vehicle in the coal mine of this embodiment based on the method for positioning the auxiliary transportation vehicle in the coal mine in Embodiment 1 is as illustrated in FIG. 5. The system includes the following.

A strap-down inertial navigation module 1 is installed at a center position of the vehicle.

Four encoder modules 2 are installed on axles of the vehicle and respectively connected with four wheels to detect rotation velocities of the four wheels respectively.

An angle sensor module 3 is installed on an input shaft of a steering wheel of the vehicle to detect a rotation angle of the steering wheel.

A communication module 4 is installed on the vehicle and configured to receive and transmit data.

A plurality of beacon calibration modules 7 are respectively installed at each branch roadway 9 and calibrated with position information corresponding to the installation positions, when the vehicle travels to the branch roadway 9, the beacon calibration module 7 calibrates the positioning information of the vehicle.

A data processing module 5 is arranged in a dispatching room outside a main roadway 8, data for the strap-down inertial navigation module 1, the encoder modules 2, the angle sensor module 3 and the beacon calibration modules 7 are transmitted by the communication module 4 to the data processing module 5, and the positioning information is processed in the data processing module 5.

A monitoring industrial computer 6 is arranged in the dispatching room outside the main roadway 8, processing results of the data processing module 5 are stored and presented in the monitoring industrial computer 6.

The system for positioning the auxiliary transportation vehicle in this embodiment is utilized for implementing the method for positioning the auxiliary transportation vehicle in the coal mine in Embodiment 1.

Embodiment 3

The computer-readable storage medium of this embodiment is used to store non-transitory computer-readable instructions, and when the non-transitory computer-readable instructions are executed by a computer, the method for positioning the auxiliary transportation vehicle in the coal mine in Embodiment 1 is implemented.

The storage medium described in this embodiment can be a magnetic disk, an optical disk, a read-only storage memory, or a random storage memory, or the like.

The embodiments described in the present disclosure are only to describe the preferred embodiments of the present disclosure, and do not limit the concept and scope of the present disclosure. Without departing from the design ideas of the present disclosure, all kinds of deformations and improvements made by those of ordinary skilled in the art to the technical solutions of the present disclosure should fall within the protection scope of the present disclosure.

What is claimed is:

1. A method for positioning an auxiliary transportation vehicle in a coal mine, characterized by comprising following steps:

step 1, acquiring a rotation velocity of each wheel and a rotation angle of a steering wheel, constructing a kinematics model based on wheels not for steering of the vehicle, and a kinematics model based on wheels for steering of the vehicle, respectively, and constructing, according to the kinematics model based on the wheels not for steering of the vehicle and the kinematics model based on the wheels for steering of the vehicle, a kinematics model based on a geometric center of the vehicle;

step 2, according to a travelling condition of the vehicle, a, integrating, when the vehicle is in a normal travelling state, the kinematics model based on the geometric center of the vehicle with a strap-down inertial navigation system for positioning; and b, integrating, when the vehicle is in an abnormal travelling state, the kinematics model based on the wheels not for steering of the vehicle with the strap-down inertial navigation system for positioning; and step3, positioning the auxiliary transportation vehicle in the coal mine according to the integrated kinematics model in the step 2, wherein the kinematics model based on the wheels not for steering of the vehicle in the step 1 is as follows:

S10, a forward velocity $v_{O_1}$ of the vehicle based on the wheels not for steering is $$v_{O_1} = \frac{v_A + v_B}{2};$$

S11, a heading angle θ of the vehicle based on the wheels not for steering is $$\theta = \theta_1 = \theta_2 = \sin\theta_1 = \frac{d}{L} = \frac{(v_B - v_A) \cdot \Delta t}{L};$$

and

S12, an output of the kinematics model based on the wheels not for steering of the vehicle is $$[v_{O_1}, \theta]^T;$$

where $v_A$ is a rotation velocity of one non-steering wheel of the vehicle, $v_B$ is a rotation velocity of another non-steering wheel of the vehicle, $\theta_1$ is an included angle between non-steering axles at two adjacent time points, and $\theta_2$ is an included angle between extension lines of the non-steering axles at two adjacent time points, d is a distance traveled by one non-steering wheel that exceeds a distance traveled by another non-steering wheel at two adjacent time points, L is a distance between the two wheels not for steering, and Δt is a time difference.

2. The method for positioning the auxiliary transportation vehicle in the coal mine according to claim 1, wherein the kinematics model based on the wheels for steering of the vehicle in the step 1 is as follows:

S20, a forward velocity $v_{O_2}$ of the vehicle based on the wheels for steering is $$v_{O_2} = \frac{v_C + v_D}{2};$$

S21, a heading angle φ of the vehicle based on the wheels for steering is $$\varphi = \frac{\delta_1 + \delta_2}{2} = \frac{\lambda_1 \phi + \lambda_2 \phi}{2};$$

a constraint relationship between $\delta_1$ and $\delta_2$ is $$\cot\delta_2 - \cot\delta_1 = \frac{L}{H};$$

and

S22, an output of the kinematics model based on the wheels for steering of the vehicle is $$[v_{O_2}\varphi]^T;$$

where $v_C$ is a rotation velocity of one steering wheel of the vehicle, $v_D$ is a rotation velocity of another steering wheel of the vehicle, $\delta_1$ is a deflection angle of one steering wheel of the vehicle, $\delta_2$ is a deflection angle of another steering wheel of the vehicle, $\phi$ is the rotation angle of the steering wheel, $\lambda_1$ is a proportional coefficient of $\delta_1$ relative to $\phi$, $\lambda_2$ is a proportional coefficient of $\delta_2$ relative to $\phi$, and H is a distance between the two axles of the vehicle.

3. The method for positioning the auxiliary transportation vehicle in the coal mine, according to claim 2, wherein the kinematics model based on the geometric center of the vehicle in the step 1 is as follows:

S30, a forward velocity $v_O$ of the vehicle based on the geometric center is, $$v_0 = \frac{v_{O_1} + v_{O_2}}{2};$$

S31, a heading angle $\psi$ of the vehicle based on the geometric center is, $$\psi = \frac{\theta + \varphi}{2};$$

and

S32, an output of the kinematics model based on the geometric center of the vehicle is, $$[v_O\psi]^T.$$

4. The method for positioning the auxiliary transportation vehicle in the coal mine, according to claim 3, wherein in the step 2, the kinematics model based on the geometric center of the vehicle is integrated with the strap-down inertial navigation system for positioning through Kalman filtering and the kinematics model based on the wheels not for steering of the vehicle is integrated with the strap-down inertial navigation system for positioning through Kalman filtering.

5. The method for positioning the auxiliary transportation vehicle in the coal mine according to claim 4, wherein in the step 2, steps of determining that the vehicle is in the abnormal state are as follows:

setting a threshold $v_{m1}=(1+k) v_{O_2}$, and setting a threshold $v_{m2}=(1-k) v_{O_2}$, where k is 0.2 to 0.3; and determining, when $v_{O_1} \geq v_{m1}$ or $v_{O_1} \leq v_{m2}$ is detected, that the vehicle is in the abnormal travelling state.

6. The method for positioning the auxiliary transportation vehicle in the coal mine according to claim 5, wherein the step 2 further includes a following step:

c, calibrating, when the vehicle passes through an intersection of an underground roadway, positioning information of the vehicle according to positioning information of a corresponding intersection.

7. The method for positioning the auxiliary transportation vehicle in the coal mine, according to claim 6, wherein the step 2 further includes a following step:

d, correcting, by a zero velocity correction algorithm, the positioning information of the vehicle, when the vehicle is in a midway shutdown state.

\* \* \* \* \*